United States Patent
Kim et al.

(10) Patent No.: US 9,452,687 B2
(45) Date of Patent: Sep. 27, 2016

(54) METHOD AND APPARATUS FOR CONTROLLING COLD START OF FUEL CELL VEHICLE

(71) Applicants: Hyundai Motor Company, Seoul (KR); Kia Motors Corp., Seoul (KR)

(72) Inventors: Dae Jong Kim, Yongin-si (KR); Seon Hak Kim, Yongin-si (KR)

(73) Assignees: HYUNDAI MOTOR COMPANY, Seoul (KR); KIA MOTORS CORP., Seoul (KR)

( * ) Notice: Subject to any disclaimer, the term of this patent is extended or adjusted under 35 U.S.C. 154(b) by 149 days.

(21) Appl. No.: 14/272,122

(22) Filed: May 7, 2014

(65) Prior Publication Data

US 2015/0120111 A1    Apr. 30, 2015

(30) Foreign Application Priority Data

Oct. 29, 2013    (KR) .................. 10-2013-0129285

(51) Int. Cl.
| | |
|---|---|
| B60L 9/00 | (2006.01) |
| B60L 11/00 | (2006.01) |
| G05D 1/00 | (2006.01) |
| G05D 3/00 | (2006.01) |
| G06F 7/00 | (2006.01) |
| G06F 17/00 | (2006.01) |
| B60L 11/18 | (2006.01) |
| H01M 8/04 | (2016.01) |

(52) U.S. Cl.
CPC .......... *B60L 11/1885* (2013.01); *B60L 11/189* (2013.01); *H01M 8/04223* (2013.01); *H01M 8/04253* (2013.01); *H01M 8/04358* (2013.01); *B60L 2240/36* (2013.01); *H01M 2250/20* (2013.01); *Y02E 60/50* (2013.01); *Y02T 90/32* (2013.01); *Y02T 90/34* (2013.01)

(58) Field of Classification Search
CPC .............. B60L 11/1885; B60L 11/189; B60L 2240/36; H01M 8/04358; H01M 8/04223; H01M 8/04253; H01M 2250/20
USPC .......................................................... 701/22
See application file for complete search history.

(56) References Cited

U.S. PATENT DOCUMENTS

| | | | | |
|---|---|---|---|---|
| 2005/0189156 | A1* | 9/2005 | Osborne ............. | B60L 11/1885 429/413 |
| 2007/0092771 | A1* | 4/2007 | Wake ................ | H01M 8/04179 429/414 |

(Continued)

FOREIGN PATENT DOCUMENTS

| | | |
|---|---|---|
| KR | 2010-0051509 A | 5/2010 |
| KR | 2011-0059030 A | 6/2011 |

(Continued)

*Primary Examiner* — Calvin Cheung
*Assistant Examiner* — Paula L. Schneider
(74) *Attorney, Agent, or Firm* — McDermott Will & Emery LLP

(57) ABSTRACT

A method for controlling a cold start of a fuel cell vehicle includes detecting and storing temperatures at an inlet and an exit of fuel cell cooling water a plurality of times after turning-off of the fuel cell vehicle. A start sequence is controlled based on the lowest temperature of the stored temperatures and temperatures at the inlet and exit of the cooling water at a restart of the vehicle. Accordingly, it is possible to enhance start-up stability and driving stability by controlling a cold start sequence according to an internal state of the fuel cell stack.

10 Claims, 5 Drawing Sheets

(56) References Cited

U.S. PATENT DOCUMENTS

| | | | | |
|---|---|---|---|---|
| 2010/0204845 A1* | 8/2010 | Ohuchi | H02J 3/14 700/291 |
| 2010/0266913 A1* | 10/2010 | Limbeck | H01M 16/006 429/429 |
| 2011/0087389 A1* | 4/2011 | Burleigh | B60L 11/1885 701/22 |
| 2011/0244349 A1* | 10/2011 | Rainville | H01M 8/04029 429/429 |

FOREIGN PATENT DOCUMENTS

| | | |
|---|---|---|
| KR | 2011-0062627 A | 6/2011 |
| KR | 2012-0061663 A | 6/2012 |

\* cited by examiner

FIG. 4

| | Case 1 | Case 2 | Case 3 | Case 4 | Case 5 | Case 6 |
|---|---|---|---|---|---|---|
| Turn-off | | | | | | |
| 1st detection | TE1 > a<br>TE2 > a | TE1 > a<br>TE2 > a | TE1 > a<br>TE2 > a | TE1 > a<br>TE2 > a | TE1 > a<br>TE2 > a | TE1 > a<br>TE2 > a |
| 2nd detection | b < TE1 < a<br>b < TE2 < a | TE1 > a<br>TE2 > a | b < TE1 < a<br>b < TE2 < a | b < TE1 < a<br>b < TE2 < a | b < TE1 < a<br>b < TE2 < a | b < TE1 < a<br>b < TE2 < a |
| 3rd detection | b < TE1 < a<br>b < TE2 < a | b < TE1 < a<br>b < TE2 < a | TE1 < b<br>TE2 < b | TE1 < b<br>TE2 < b | b < TE1 < a<br>b < TE2 < a | TE1 < b<br>TE2 < b |
| 4th detection | TE1 < b<br>TE2 < b | b < TE1 < a<br>b < TE2 < a | b < TE1 < a<br>b < TE2 < a | TE1 < b<br>TE2 < b | b < TE1 < a<br>b < TE2 < a | b < TE1 < a<br>b < TE2 < a |
| | ⋮ | ⋮ | ⋮ | ⋮ | ⋮ | ⋮ |
| Turn-on | TE1 < b<br>TE2 < b | TE1 > a<br>TE2 > a | TE1 > a<br>TE2 > a | b < TE1 < a<br>b < TE2 < a | b < TE1 < a<br>b < TE2 < a | TE1 > a<br>TE2 > a |

METHOD AND APPARATUS FOR CONTROLLING COLD START OF FUEL CELL VEHICLE

CROSS-REFERENCE(S) TO RELATED APPLICATION

The present application claims the benefit of priority to Korean Patent Application Number 10-2013-0129285 filed on Oct. 29, 2013, the entire contents of which is incorporated herein for all purposes by this reference.

TECHNICAL FIELD

The present disclosure relates to a method and apparatus for controlling a cold start of a fuel cell vehicle, and more particularly, to a method and apparatus for controlling a cold start of a fuel cell vehicle capable of improving durability of a fuel cell stack and start-up stability of the fuel cell vehicle, by controlling the cold start after checking a state of the fuel cell stack while the vehicle is turned off.

BACKGROUND

Generally, a fuel cell vehicle includes a fuel cell stack having a plurality of fuel cells stacked, which are used as a power source thereof, a fuel supplier for supplying hydrogen or the like as a fuel to the fuel cell stack, an air supplier for supplying oxygen as an oxidizing agent necessary for an electrochemical reaction, a water and heat controller for controlling temperature of the fuel cell stack, and so on.

The fuel supplier depressurizes compressed hydrogen in a hydrogen tank to supply it to an anode of the stack as a fuel electrode, and the air supplier activates an air blower to supply air drawn from outside to a cathode of the stack as an air electrode.

When the anode of the stack is supplied with hydrogen, and the cathode is supplied with oxygen, hydrogen ions are separated through a catalytic reaction at the anode. The separated hydrogen ions are delivered to the cathode through an electrolyte membrane, and the electrochemical reaction occurs at the cathode by means of electrons and the hydrogen ions separated at the anode and oxygen, thereby generating electrical energy. More specifically, hydrogen is oxidized electrochemically at the anode, and oxygen is reduced electrochemically at the cathode. The separation movement of the electrons caused as such produces electricity and heat, and a chemical reaction for combining hydrogen and oxygen produces water vapor or water. Though the amount of water produced varies according to states of operation, such as current and operating temperature, it remains inside the fuel cell stack and can be frozen at temperatures below the freezing point.

The frozen water content inside the stack may block a reaction surface or a flow path, thereby hindering a generation of a normal voltage or normal available power output at the next start-up of a vehicle. The more water content is frozen at lower temperature, the generation of the available power output is further deteriorated, which may not allow a fuel cell vehicle to run normally and may cause a time delay in starting.

Though a cold start has been controlled based on temperatures at an inlet and exit of cooling water for a fuel cell, it is impossible to accurately estimate an internal state of a fuel cell when there is a change in the outside temperature between at the time of turning-off and at the restart of a vehicle.

The features described above as the background of the disclosure are only for the understanding of the related techniques of the present disclosure, and such features should not be considered to be fallen within prior art already known to a person skilled in the art to which the disclosure pertains.

SUMMARY

The present disclosure provides a method and apparatus for controlling a cold start of a fuel cell vehicle capable of periodically checking an internal state of a fuel cell stack even after turning-off of a vehicle and controlling the cold start of the fuel cell vehicle accordingly.

A method for controlling a cold start of a fuel cell vehicle in accordance with an embodiment of the present disclosure may include detecting and storing temperatures at an inlet and an exit of fuel cell cooling water a number of times after turning-off of the fuel cell vehicle. A start sequence is controlled based on the lowest temperature of the stored temperatures and temperatures at the inlet and exit of the cooling water when restarting the vehicle.

The step of detecting may detect the temperatures at the inlet and exit of the cooling water for a preset detection time, based on a generation clock signal received periodically and a removal clock signal received after the preset detection time from when the generation clock signal is received.

A detecting period may vary according to a time elapsed after the vehicle is turned-off and a length of the preset time.

The detecting period when the time elapsed after the turning-off of the vehicle is longer than the length of the preset time may be longer than the detecting period when the time elapsed after the turning-off of the vehicle is shorter than the length of the preset time.

The method may sequentially delete the temperatures from the temperature stored if the number of times of detecting exceeds a preset number.

The step of controlling may perform a first level cold start sequence if the temperatures at the inlet and exit of the cooling water detected at the restart of the vehicle fall within a first range and the lowest temperature of the stored temperatures falls within a second range.

The step of controlling may perform a second level cold start sequence if the temperatures at the inlet and exit of the cooling water detected at the restart of the vehicle fall within a first range and the lowest temperature of the stored temperatures falls within a third range.

The step of controlling may perform a second level cold start sequence if the temperatures at the inlet and exit of the cooling water detected at the restart of the vehicle fall within a second range and the lowest temperature of the stored temperatures falls within a third range.

The method may further include comparing the time elapsed after the turning-off of the vehicle and a preset reference time. The step of controlling may perform a second level cold start sequence if the temperatures at the inlet and exit of the cooling water detected at the restart of the vehicle and the lowest temperature of the stored temperatures fall within a second range if the time elapsed is longer than the preset reference time.

The step of controlling may perform a second level cold start sequence if the temperatures at the inlet and exit of the cooling water detected at a restart of the vehicle fall within a first range and the lowest temperature of the stored temperatures falls within a third range.

An apparatus for controlling a cold start of a fuel cell vehicle in accordance with an embodiment of the present disclosure may include cooling water exit and inlet temperature sensors configured to detect temperatures at an inlet and an exit of fuel cell cooling water. A fuel cell controller is configured to comprise a storage for storing the temperatures at the inlet and exit of the fuel cell cooling water detected a number of times by the temperature sensors after the fuel cell vehicle is turned-off. A start sequence is controlled based on the lowest temperature of the stored temperatures and the temperatures at the inlet and exit of the cooling water detected at a restart of the vehicle.

The apparatus for controlling a cold start of a fuel cell vehicle may further include a real time clock configured to transmit clock signals to the fuel cell controller, wherein the fuel cell controller stores the temperatures at the inlet and exit of the cooling water detected for a preset detection time in the storage, based on a generation clock signal received periodically from the real time clock and a removal clock signal received after the preset detection time from when the generation clock signal is received.

BRIEF DESCRIPTION OF THE DRAWINGS

The above and other aspects, features and advantages of certain exemplary embodiments of the present disclosure will be more apparent from the following description taken in conjunction with the accompanying drawings.

FIG. 4 is a diagram illustrating the control of a cold start according to temperatures at an inlet and exit of cooling water in a method for controlling a cold start of a fuel cell vehicle in accordance with an embodiment of the present disclosure.

DETAILED DESCRIPTION

Figure 1:
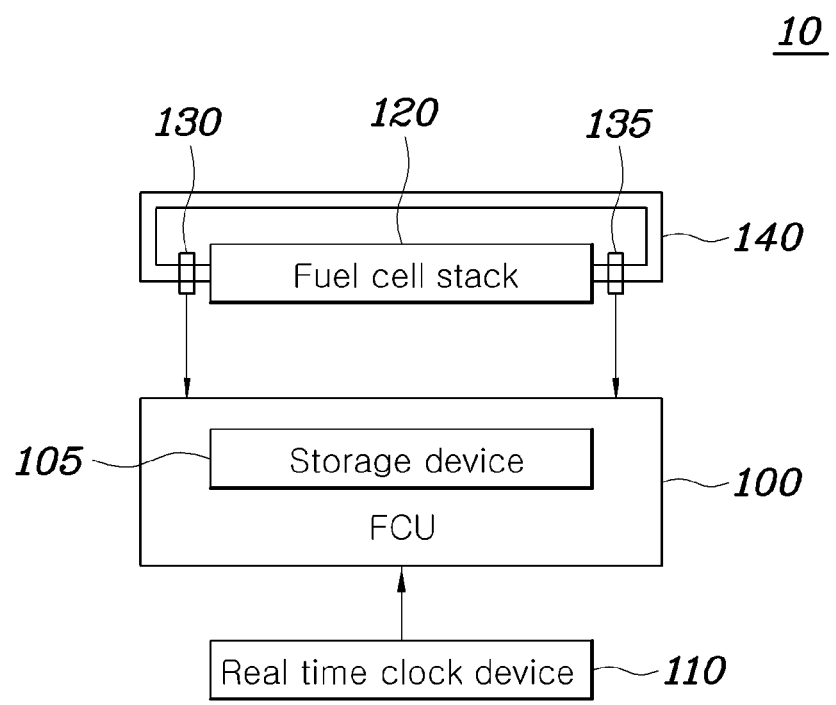
FIG. 1 is a schematic structural diagram illustrating an apparatus for controlling a cold start of a fuel cell vehicle according to an embodiment of the present disclosure.

Specific structural or functional descriptions of exemplary embodiments according to the present disclosure disclosed herein are by way of illustration only for describing the embodiments of the disclosure, and such embodiments of the disclosure can be carried out in various forms, and it is understood that the present disclosure is not be limited to the embodiments disclosed herein.

As embodiments of the present disclosure are capable of various modification and variations, exemplary embodiments will be described below in detail with reference to the accompanying drawings. It should be understood that the embodiments according to the concepts of the present disclosure are not limited in any manner to those disclosed herein, and all modifications, equivalents, and substitutes within the spirit and scope of the disclosure are within the metes and bounds of the disclosure.

It will be understood that although the terms "first," "second," etc. are used herein to describe various elements, these elements should not be limited by these terms. These terms are used only to distinguish one element from another, for example, a first component may be referred to as a second component or vice versa, without departing from the scope of the concepts of the disclosure.

When referring to "connected" or "coupled" for one component to another, though it is possible for one component to be connected or coupled directly to another, it is also understood that there may be a third component therebetween. However, when referring to "directly connected" or "directly coupled" for one component to another, it is understood that there is no other component therebetween. So are the expressions for describing inter-relationship between components, such as "between," "directly between," "adjoining," "directly adjoining," etc.

The terms used herein are illustrative purpose only for describing particular embodiments and are not intended to limit the disclosure. Expressions of singular items also include plural items unless otherwise clearly indicated in the context. The terms used herein such as "comprising," "having," etc. are intended to define existence of features, numbers, steps, actions, components, parts, or combinations thereof described herein, and it is not intended to preclude the possibility of existence or addition of one or more of the features, numbers, steps, actions, components, parts, or combinations thereof.

Unless otherwise defined, all the terms used herein including technical or scientific terms have the same meaning commonly understood by a person having an ordinary skill in the art to which the disclosure pertains. The terms defined in dictionaries that are commonly used are to have the same meaning in the context of relevant technology, and should not be construed to have an overly or excessively formal meaning unless otherwise clearly defined.

Hereinafter, the present disclosure will be described in detail by way of exemplary embodiments thereof with reference to accompanying drawings. Like numerals are used to designate like elements in the drawings.

FIG. 1 is a schematic structural diagram illustrating an apparatus for controlling a cold start of a fuel cell vehicle according to an embodiment of the present disclosure. Referring to FIG. 1, the apparatus 10 for controlling the cold start of the fuel cell vehicle may include a fuel cell controller (FCU) 100 provided with a storage 105, a real time clock 110, a fuel cell stack 120, a cooling water exit temperature sensor 130, a cooling water inlet temperature sensor 135, and a fuel cell cooling water line 140.

The real time clock 110 may transmit clock signals to the fuel cell controller 100 on a preset period, or on a predetermined time interval while a vehicle is turned off. The clock signals may comprise a generation clock signal for waking up the fuel cell controller 100 while the vehicle is turned off and a removal clock signal for stopping the collection of temperature data measured by the temperature sensors. Thus, the fuel cell controller 100 receives and stores the temperature data measured by the cooling water exit temperature sensor 130 and the cooling water inlet temperature sensor 135 in the storage 105. In other words, the fuel cell controller 100 may collect and store the temperature data measured by the cooling water exit temperature sensor 130 and the cooling water inlet temperature sensor 135 in the storage 105 when the generation clock signal is received until the removal clock signal is received. The storage 105 may be implemented with electrically erasable programmable read-only memory (EEPROM), flash memory, magnetic RAM (MRAM), spin-transfer torque MRAM, conductive bridging RAM (CBRAM), ferroelectric RAM (FeRAM), phase change RAM (PRAM) also called ovonic unified memory (OUM), resistive RAM (RRAM or ReRAM), nanotube RRAM, polymer RAM (PoRAM), nano floating gate memory (NFGM), holographic memory, molecular electronics memory device, or insulator resistance change memory. The storage 105 may store temperature values at the cooling water exit and the cooling water inlet detected by the cooling water exit temperature sensor 130 and the cooling water inlet temperature sensor 135.

Figure 2:
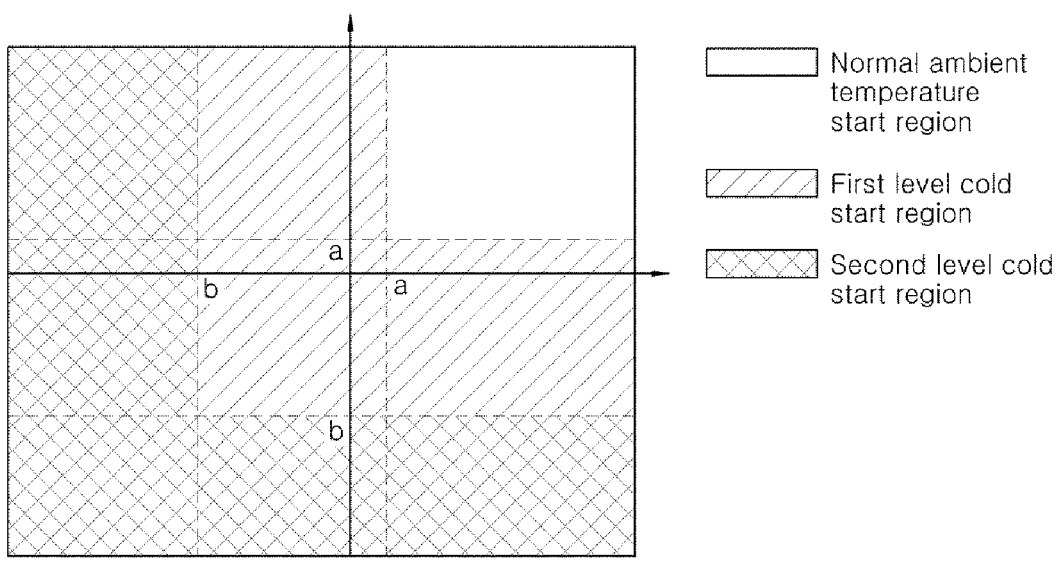
FIG. 2 is a graph showing a relationship between the temperatures at an inlet and exit of cooling water measured at a start of a vehicle and a cold start thereof.

FIG. 2 is a graph showing a relationship between temperatures at the inlet and exit of cooling water measured at a start of a vehicle and a cold start thereof. Referring to FIG. 2, the graph is divided into three regions. The respective regions are defined according to the temperatures at the exit and inlet of the cooling water measured at the start of the vehicle, and each region has a different start sequence to perform.

The smallest region at an right upper side is a normal ambient temperature start region for performing an ambient temperature start sequence when both temperatures at the exit and inlet of the cooling water fall within a first range higher than a preset temperature "a," the middle region is a first level cold start region for performing a first level cold start sequence when both temperatures at the exit and inlet of the cooling water fall within a second range between preset temperatures. The remaining region is a second level cold start region for performing a second level cold start sequence when the both temperatures at the exit and inlet of the cooling water fall within a third range lower than a preset temperature "b." However, since it is difficult to determine whether the temperature of the fuel cell stack has gone up from a lower temperature or has gone down from a higher temperature based on the temperature detected at the start of the vehicle, it is difficult to estimate a freezing and condensation state inside the fuel cell stack.

For example, in the case where the temperatures at the exit and inlet of the cooling water have both gone up higher than b due to an increase in the outside temperature of the fuel cell vehicle after being left at a low temperature (lower than "b") for a prolonged time (longer than 24 hours), though the first level cold start sequence or the ambient temperature start sequence is to be performed, the second level cold start sequence has to be performed in light of the actual internal state of the fuel cell stack. Accordingly, if the first level cold start sequence or the ambient temperature start sequence is performed, there is a possibility of deteriorating the performance of the fuel cell stack or causing a reverse voltage because of an insufficient temperature rise.

Figure 3:
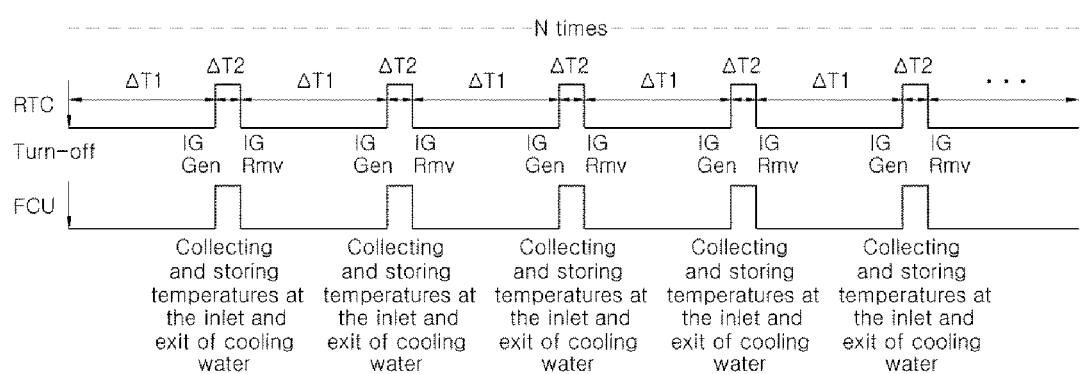
FIG. 3 is a diagram illustrating times for detecting temperatures at an inlet and exit of cooling water in a method for controlling a cold start of a fuel cell vehicle in accordance with an embodiment of the present disclosure.

FIG. 3 is a diagram illustrating times for detecting temperatures at inlet and exit of cooling water in a method for controlling a cold start of a fuel cell vehicle in accordance with an embodiment of the present disclosure. Referring to FIGS. 1 and 3, a vehicle is turned off first, and then the fuel cell controller 100 receives a generation clock signal IG Gen after a preset time ΔT1. In other words, the real time clock 110 transmits the generation clock signal and the transmitted generation clock signal is received by the fuel cell controller 100. From this moment on, the fuel cell controller 100 may collect and store the temperature data detected by the cooling water exit temperature sensor 130 and the cooling water inlet temperature sensor 135 in the storage 105. The fuel cell controller 100 collects and stores the temperatures at the inlet and exit of the cooling water from when the generation clock signal IG Gen is received to when the removal clock signal IG Rmv is received after a preset detection time ΔT2.

If a vehicle remains turned off, the real time clock 110 may transmit the generation clock signal IG Gen after the preset time ΔT1 from when the removal clock signal IG Rmv has been transmitted. The fuel cell controller 100 may detect and store the temperatures at the inlet and exit of the cooling water from when the generation clock signal is received to when the removal clock signal is received. In other words, temperatures are detected at the inlet and exit of the cooling water on a preset time interval ΔT1 while the vehicle is turned off. If the vehicle still remains turned off without a next start-up even after that, the real time clock 110 may transmit the generation clock signal IG Gen after the preset time ΔT1 from when the removal clock signal has been transmitted. In addition, the real time clock 110 may transmit the removal clock signal IG Rmv to the fuel cell controller 100 after the preset detection time ΔT2.

That is, as the generation clock signal is received periodically, temperatures are detected a plurality of times at the inlet and exit of the fuel cell cooling water on a period. The period of detection may vary according to the time elapsed after the turning-off of a vehicle and the length of the preset time. For example, the period (or time interval, ΔT1) when the time elapsed after the turning-off of the vehicle is longer than the length of the preset time may be longer than the period when the time elapsed after the turning-off of the vehicle is shorter than the length of the preset time.

For instance, if the real time clock 110 transmits the generation clock signal five times and temperatures are detected five times accordingly, temperatures may be detected on an interval of eight hours if a short time has passed after the turning-off of the vehicle and temperatures may be detected on a period of twelve hours if a long time has passed after the turning-off of the vehicle. The short or long time may be defined on the basis of the length of the preset time or the number of times of detection.

Moreover, the fuel cell controller 100 may delete temperatures sequentially from the temperature stored first if the number of times of detection exceeds a preset number. In the above example, if the preset number is five, the temperature detected at the sixth cycle may be stored in the storage 105 and the temperature detected and stored at the very first cycle may be deleted. This is because the temperature data stored a long time ago may not be useful even if they are kept.

FIG. 4 is a diagram illustrating the control of a cold start according to the temperatures at the inlet and exit of the cooling water in a method for controlling a cold start of a fuel cell vehicle in accordance with an embodiment of the present disclosure. TE1 is temperature of the inlet of the cooling water and TE2 is the temperature of the exit of the cooling water. A temperature range within which the temperatures at the exit and inlet of the cooling water detected at a restart of the fuel cell vehicle fall may be divided into three ranges.

A first range is set to a temperature range which does not require any control of cold start, or which may well perform an ambient temperature start sequence without any problem. With reference to FIG. 4, a case where the temperatures at the inlet and exit of the cooling water are both greater than "a" is the first range, which corresponds to the region at the right upper side in FIG. 2. The fuel cell controller 100 may perform the ambient temperature start sequence if the temperatures at the inlet and exit of the cooling water fall within the first range.

A second range is a temperature range that requires performing a first level cold start sequence, which corresponds to the middle region in FIG. 2. With reference to the example shown in FIG. 4, the second range corresponds to a temperature range where the temperatures at the inlet and exit of the cooling water are greater than "b" but less than "a."

A third range is a temperature range performs a second level cold start sequence, which refers to a case where the temperatures at the inlet and exit of the cooling water are both less than "b," as shown in FIG. 4.

For case 1 of FIG. 4, as the temperatures at the inlet and exit of the cooling water detected at the restart of the vehicle fall within the third range and the lowest temperature of the temperatures detected and stored from the first to the fourth cycles also falls within the third range, the fuel cell controller 100 may perform the second level cold start sequence.

For case 2 of FIG. 4, as the temperatures at the inlet and exit of the cooling water detected at the restart of the vehicle fall within the first range and the lowest temperature of the temperatures detected and stored from the first to the fourth cycles falls within the second range, the fuel cell controller 100 may control to perform the first level cold start sequence.

For case 3 of FIG. 4, as the temperatures at the inlet and exit of the cooling water detected at the restart of the vehicle fall within the first range and the lowest temperature of the temperatures detected and stored from the first to the fourth cycles falls within the third range, the fuel cell controller 100 may perform the second level cold start sequence.

For case 4 of FIG. 4, as the temperatures at the inlet and exit of the cooling water detected at the restart of the vehicle fall within the second range and the lowest temperature of the temperatures detected and stored from the first to the fourth cycles falls within the third range, the fuel cell controller 100 may perform the second level cold start sequence.

For case 5 of FIG. 4, the temperatures at the inlet and exit of the cooling water detected at the restart of the vehicle and the lowest temperature of the temperatures detected and stored from the first to the fourth cycles all fall within the second range. However, the fuel cell controller 100 in this case may perform the second level cold start sequence if the time elapsed after the turning-off of the vehicle is longer than the preset reference time, and it is determined that the vehicle is left for a prolonged time even if all the temperatures at the inlet and exit of the cooling water detected at the restart of the vehicle and the lowest temperature fall within the second range.

For case 6 of FIG. 4, as the temperatures at the inlet and exit of the cooling water detected at the restart of the vehicle fall within the first range and the lowest temperature of the temperatures detected and stored from the first to the fourth cycles falls within the third range, the fuel cell controller 100 may perform the second level cold start sequence.

The above cases illustrate examples where temperatures are detected only four times before a start of a vehicle, however, the present disclosure is not limited to the embodiment shown in the drawings.

Figure 5:
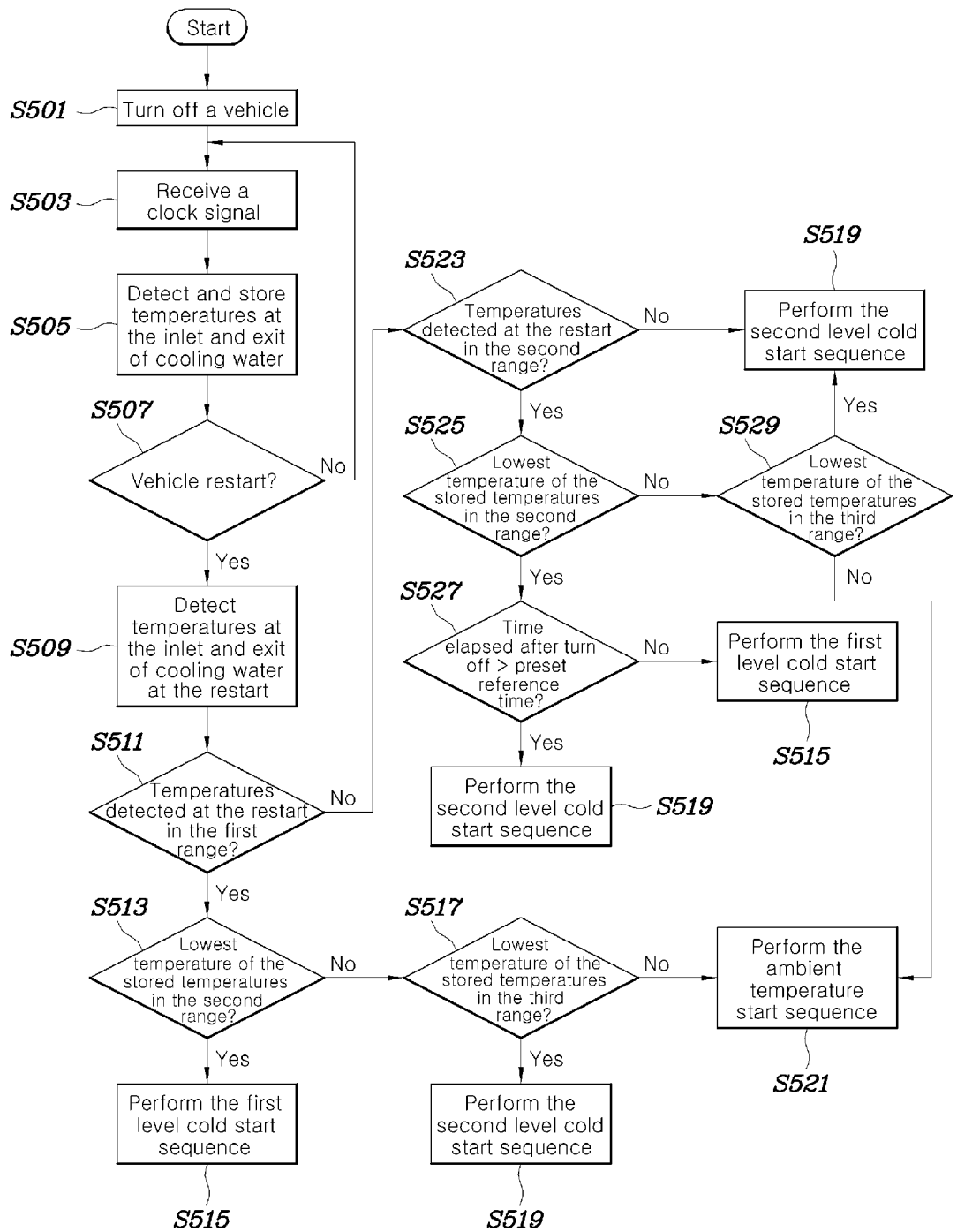
FIG. 5 is a flow chart illustrating a method for controlling a cold start of a fuel cell vehicle in accordance with an embodiment of the present disclosure.

FIG. 5 is a flow chart illustrating a method for controlling a cold start of a fuel cell vehicle in accordance with an embodiment of the present disclosure. With reference to FIGS. 1 and 5, after a vehicle is turned off at S501, the fuel cell controller 100 receives a clock signal from the real time clock 110 at S503. Once the clock signal is received from the real time clock 110, the fuel cell controller 100 controls the cooling water exit and inlet temperature sensors 130 and 135 to detect temperatures at the inlet and exit of the cooling water and stores the detected temperatures at the inlet and exit of the cooling water in the storage 105 at S505. Thereafter, depending on whether the fuel cell vehicle restarts S507, the fuel cell controller 100 controls the cooling water exit and inlet temperature sensors 130 and 135 to detect temperatures at the inlet and exit of the cooling water at the restart and stores the detected temperatures at the inlet and exit of the cooling water in the storage 105 at S509. If there is no restart, the fuel cell controller 100 continuously receives clock signals from the real time clock 110 at S503 and then detects and stores temperatures at the inlet and exit of the cooling water.

At the restart, it is determined whether the detected temperatures at the inlet and exit of the cooling water fall within the first range, or the ambient temperature start region at S511. If the detected temperatures at the inlet and exit of the cooling water fall within the first range at the restart, the fuel cell controller 100 determines whether the lowest temperature of the temperatures at the inlet and exit of the cooling water detected and stored prior to the restart falls within the second range at S513. If the lowest temperature of the temperatures at the inlet and exit of the cooling water prior to the restart is in the second range, the fuel cell controller 100 performs the first level cold start sequence at S515 because water may freeze inside the fuel cell stack. In particular, the first level cold start sequence is a start sequence for starting with supercharged air only.

If the lowest temperature of the temperatures at the inlet and exit of the cooling water detected and stored prior to the restart is not in the second range, the fuel cell controller 100 determines whether the lowest temperature of the temperatures at the inlet and exit of the cooling water detected and stored prior to the restart falls within the third range at S517. The fuel cell controller 100 may perform the second level cold start sequence at S519 if the lowest temperature of the temperatures at the inlet and exit of the cooling water detected and stored prior to the restart is in the third range even if the temperatures at the inlet and exit of the cooling water detected at the restart is in the first range. If the lowest temperature of the temperatures at the inlet and exit of the cooling water detected and stored prior to the restart is neither in the second range nor in the third range, the fuel cell controller 100 may perform the ambient temperature start sequence at S521 because the lowest temperature is in the first range.

If the temperatures at the inlet and exit of the cooling water detected at the restart are not in the ambient temperature start region, it is determined whether the detected temperatures fall within the second range, or the first level cold start region at S523. If the temperatures at the inlet and exit of the cooling water detected at the restart is neither in the first range nor in the second range, the fuel cell controller 100 may perform the second level cold start sequence at S519 because the temperatures are in the third range. The second level cold start sequence is a start sequence for starting after raising the temperature using a motor controller and a positive temperature coefficient (PTC).

If the temperatures at the inlet and exit of the cooling water detected at the restart fall within the second range, the fuel cell controller 100 determines whether the lowest temperature of the temperatures at the inlet and exit of the cooling water detected and stored prior to the restart falls within the second range at S525. If the lowest temperature of the temperatures at the inlet and exit of the cooling water detected and stored prior to the restart falls within the second range, the fuel cell controller 100 further determines whether the time elapsed between the turning-off and the restart of the vehicle exceeds a preset reference time at S527. This is because it is impossible to drive the vehicle after the start with the supercharged air only if the time elapsed between the turning-off and the restart of the vehicle exceeds the preset reference time even if the temperatures at the inlet and exit of the cooling water detected at the restart and the lowest temperature of the temperatures at the inlet and exit of the cooling water detected and stored prior to the restart are all in the second range, which means that the fuel cell vehicle has been left for a prolonged time at the second range. The preset reference time in this case may be set to 24 hours. By determining when time has passed over 24 hours after turning-off as a prolonged time, the fuel cell controller may perform the second level cold start sequence at S519. However, if the temperatures at the inlet and exit of the cooling water detected at the restart and the lowest temperature of the temperatures at the inlet and exit of the cooling water detected and stored prior to the restart are all in the second range and the time elapsed between the turning-off and the restart of the vehicle does not exceed the preset reference time, the fuel cell controller may perform the first level cold start sequence at S515.

If the lowest temperature of the temperatures at the inlet and exit of the cooling water detected and stored prior to the restart does not fall within the second range, the fuel cell controller 100 determines whether the lowest temperature of the temperatures at the inlet and exit of the cooling water detected and stored prior to the restart falls within the third range at S529. If the lowest temperature of the temperatures at the inlet and exit of the cooling water detected and stored prior to the restart falls within the third range, the fuel cell controller may perform the second level cold start sequence at S519 even if the temperatures at the inlet and exit of the cooling water detected at the restart fall within the second range. If the lowest temperature of the temperatures at the inlet and exit of the cooling water detected and stored prior to the restart is neither in the second range nor in the third range, the fuel cell controller 100 may perform the ambient temperature start sequence at S521 because the lowest temperature is in the first range.

By controlling as such, the fuel cell controller 100 may determine and apply an appropriate cold start sequence to each situation by taking into account both the outside situations of a fuel cell vehicle while the vehicle is turned off and the outside situations at the restart of the vehicle, thereby enhancing start-up stability and driving stability. It is also possible to improve the durability of the fuel cell stack by preventing a voltage drop or a reverse voltage resulting from the loss of electromotive force which may occur in some fuel cells at a cold start of a fuel cell vehicle.

According to a method and apparatus for controlling a cold start of a fuel cell vehicle of an embodiment of the present disclosure, it is possible to check an internal state of a fuel cell stack by taking into account the change in the outside temperature between at the time of turning-off and at a next restart of the vehicle, thereby enhancing start-up stability and driving stability by controlling a cold start sequence according to the internal state of the fuel cell stack.

It is also possible to improve the durability of the fuel cell stack by preventing a voltage drop or reverse voltage from occurring in the fuel cell at a cold start of the fuel cell vehicle.

While the disclosure has been shown and described with reference to exemplary embodiments thereof, it will be understood by those skilled in the art that various changes in form and details may be made therein without departing from the spirit and scope of the disclosure as defined by the appended claims. Therefore, the scope of the disclosure is defined not by the detailed description of the disclosure but by the appended claims, and all differences within the scope will be construed as being included in the present disclosure.

What is claimed is:

1. A method for controlling a cold start of a fuel cell vehicle comprising:
   detecting, by temperature sensors, temperatures at an inlet and an exit of fuel cell cooling water a number of times after turning-off of the fuel cell vehicle;
   storing, by a fuel cell controller, the detected temperatures; and
   controlling, by the fuel cell controller, a start sequence based on the lowest temperature of the stored temperatures and temperatures at the inlet and exit of the cooling water at a restart of the vehicle,
   wherein, in the step of controlling, the fuel cell controller performs a first level cold start sequence if the temperatures at the inlet and exit of the cooling water detected at the restart of the vehicle fall within a first range and the lowest temperature of the stored temperatures falls within a second range,
   wherein, in the step of controlling, the fuel cell controller performs a second level cold start sequence if the temperatures at the inlet and exit of the cooling water detected at the restart of the vehicle fall within the first range or a second range and the lowest temperature of the stored temperatures falls within a third range,
   wherein the second range has a lower temperature range than the first range, the third range has a lower temperature range than the second temperature range,
   wherein, in the first level cold start sequence, the fuel cell controller controls the fuel cell so as to start with supercharged air only,
   wherein, in the second level cold start sequence, the fuel cell controller controls the fuel cell so as to start after raising the temperature using heating means.

2. The method of claim 1, wherein the step of detecting detects the temperatures at the inlet and exit of the cooling water for a preset detection time, based on a clock signal received periodically and a removal clock signal received after the preset detection time from when the clock signal is received.

3. The method of claim 1, wherein a period of detecting varies according to a time elapsed after the turning-off of the vehicle and a length of a preset time.

4. The method of claim 3, wherein the period of detecting when the time elapsed after the turning-off of the vehicle is longer than the length of the preset time is longer than the period of detecting when the time elapsed after the turning-off of the vehicle is shorter than the length of the preset time.

5. The method of claim 1, further comprising deleting temperatures sequentially from the temperatures stored first if the number of times of detecting exceeds a preset number.

6. The method of claim 1, wherein the step of controlling performs a second level cold start sequence if the temperatures at the inlet and exit of the cooling water detected at the restart of the vehicle fall within a second range and the lowest temperature of the stored temperatures falls within a third range.

7. The method of claim 1, further comprising comparing a time elapsed after the turning-off of the vehicle and a preset reference time,
   wherein the step of controlling performs a second level cold start sequence if the temperatures at the inlet and exit of the cooling water detected at the restart of the vehicle and the lowest temperature of the stored temperatures fall within a second range if the time elapsed is longer than the preset reference time.

8. The method of claim 1, wherein the step of controlling performs a second level cold start sequence if the temperatures at the inlet and exit of the cooling water detected at the restart of the vehicle fall within a first range and the lowest temperature of the stored temperatures falls within a third range.

9. An apparatus for controlling a cold start of a fuel cell vehicle comprising:
- cooling water exit and inlet temperature sensors configured to detect temperatures at an inlet and an exit of fuel cell cooling water; and
- a fuel cell controller configured to comprise a storage for storing the temperatures at the inlet and exit of the fuel cell cooling water detected a number of times by the temperature sensors after turning-off of the fuel cell vehicle, for controlling a start sequence based on the lowest temperature of the stored temperatures and the temperatures at the inlet and exit of the cooling water detected at a restart of the fuel cell vehicle,
- wherein the fuel cell controller performs a first level cold start sequence if the temperatures at the inlet and exit of the cooling water detected at the restart of the vehicle fall within a first range and the lowest temperature of the stored temperatures falls within a second range,
- wherein the fuel cell controller performs a second level cold start sequence if the temperatures at the inlet and exit of the cooling water detected at the restart of the vehicle fall within the first range or a second range and the lowest temperature of the stored temperatures falls within a third range,
- wherein the second range has a lower temperature range than the first range, the third range has a lower temperature range than the second temperature range,
- wherein, in the first level cold start sequence, the fuel cell controller controls the fuel cell so as to start with supercharged air only,
- wherein, in the second level cold start sequence, the fuel cell controller controls the fuel cell so as to start after raising the temperature using heating means.

10. The apparatus of claim 9, further comprising a real time clock for transmitting clock signals to the fuel cell controller,
- wherein the fuel cell controller stores the values of the temperatures detected at the inlet and exit of the cooling water for a preset detection time in the storage, based on a clock signal received periodically from the real time clock and a removal clock signal received after the preset detection time from when the generation clock signal is received.

* * * * *